United States Patent
Yeager et al.

(10) Patent No.: US 6,497,933 B1
(45) Date of Patent: Dec. 24, 2002

(54) ANTISTATIC COMPOSITION FOR USE IN A LABEL CONSTRUCTION

(75) Inventors: Steven L. Yeager, Centerville, OH (US); Rajendra Mehta, Centerville, OH (US)

(73) Assignee: The Standard Register Company, Dayton, OH (US)

(*) Notice: Subject to any disclaimer, the term of this patent is extended or adjusted under 35 U.S.C. 154(b) by 0 days.

(21) Appl. No.: 09/558,760

(22) Filed: Apr. 21, 2000

(51) Int. Cl.[7] .................................................. B32B 7/12
(52) U.S. Cl. .................... 428/41.8; 428/40.1; 428/50; 428/355 R; 428/343; 428/352; 525/25; 525/26; 523/200; 523/205; 523/206
(58) Field of Search .................... 428/41.5, 41.8, 428/50, 355 R, 343, 352

(56) References Cited

U.S. PATENT DOCUMENTS

| | | | |
|---|---|---|---|
| 4,074,000 A | * | 2/1978 | Hankee et al. ............... 428/323 |
| 4,196,001 A | | 4/1980 | Joseph et al. |
| 4,772,512 A | | 9/1988 | Nagafuchi |
| 4,806,410 A | | 2/1989 | Armington et al. |
| 5,194,327 A | | 3/1993 | Takahashi et al. |
| 5,437,917 A | | 8/1995 | Ohe et al. |
| 5,591,255 A | | 1/1997 | Small et al. |
| 5,658,677 A | | 8/1997 | Ebisch et al. |
| 5,700,623 A | | 12/1997 | Anderson et al. |
| 5,885,678 A | * | 3/1999 | Malhotra .................... 428/41.8 |
| 6,110,552 A | * | 8/2000 | Casey et al. ................ 428/40.1 |
| 6,376,067 B1 | * | 4/2002 | Heberger et al. ........... 428/336 |
| 2001/0018125 A1 | * | 8/2001 | Shibuya et al. ............. 428/352 |

* cited by examiner

Primary Examiner—Robert Dawson
Assistant Examiner—Christopher M. Keehan
(74) Attorney, Agent, or Firm—Kilworth, Gottman, Hagan & Schaeff, LLP

(57) ABSTRACT

An antistatic composition is provided for use with a label construction which includes an organic cationic polyelectrolyte, a binder, and a surfactant. The composition is preferably used in a label construction comprising a polymer film substrate having a pressure sensitive adhesive on its second surface, a release liner overlying the pressure sensitive adhesive, with the antistatic composition being provided on the second surface of release liner. The antistatic composition reduces the surface resistivity of the second surface of said release liner. The antistatic composition may also be used in combination with a toner adhesion-enhancing coating which is provided on the first surface of the substrate to improve print quality. The labels may be stacked or provided in roll form such that the antistatic composition reduces the coefficient of friction between adjacent labels and prevents the build-up of static charges on the labels.

16 Claims, 2 Drawing Sheets

ANTISTATIC COMPOSITION FOR USE IN A LABEL CONSTRUCTION

BACKGROUND OF THE INVENTION

This invention relates to an antistatic composition for use in a label construction, and more particularly, to an antistatic composition which may be applied to a substrate in a label construction which provides antistatic properties to the label without interfering with high print quality.

Film label constructions are widely used in the art. Such label constructions typically comprise a polyester film which is printed on one surface and a pressure sensitive adhesive on the opposite surface. Typically, the adhesive is covered with a release liner. A disadvantage of such label constructions is that the use of polyester films results in the accumulation of static electrical charges on the films. Such charges are often generated when the labels are provided in direct contact with one another such as in the form of a stack or a roll. The generation of static charges is also affected by the conductivity of the film material and the conditions under which the material is handled. The build-up of static charges causes many problems during printing of the labels, including the attraction of dust and debris to the film, causing poor print quality. In sheet-fed non-impact printers, the static charges often cause sheets to stick together, resulting in skewing, double-feeding, and jams in the printer. When printing polyester labels in roll form, build-up of static charges can cause print quality to deteriorate or even cause the printer to shut down.

To reduce or eliminate the adverse effects resulting from the accumulation of static charges, many label manufacturers apply an antistatic coating to the surface of the film layer. However, such antistatic coatings can interfere with the ability of the film to accept toner images, resulting in poor print quality because of toner bonding problems. While toner-bond enhancement coatings are known which may be applied to the film to increase adhesion of printed images to the film, such toner-bond enhancement coatings often negate the effectiveness of the antistatic coating.

Accordingly, there is still a need in the art for an antistatic coating which may be used on film label constructions which eliminates static build-up while not adversely affecting images to be printed on the film with adequate toner adhesion.

SUMMARY OF THE INVENTION

The present invention meets that need by providing an antistatic composition for use with a film label construction which eliminates the problem of static build-up. The antistatic composition is preferably applied to the release liner in the construction. Optionally, the antistatic composition is applied in combination with a toner adhesion-enhancing coating which is applied to the film layer so as to provide high quality print quality without adversely affecting the properties of the antistatic composition. The resulting reduction in static electricity build-up eliminates mis-feeds or double feeding problems when using high-speed sheet-fed printers for processing sheets or rolls of film label constructions.

According to one aspect of the present invention, an antistatic composition for use in a label construction is provided. The antistatic composition comprises an organic cationic polyelectrolyte, a binder, and a surfactant. Preferably, the binder comprises polyvinylpyrrolidone.

In a preferred embodiment of the invention, a label construction is provided comprising a substrate having first and second major surfaces; a pressure sensitive adhesive on the second surface of the substrate; and a release liner having first and second major surfaces which overlies the pressure sensitive adhesive. The substrate preferably comprises polyester. The release liner preferably comprises a cellulosic substrate having a release coating on its first surface.

An antistatic composition is included on the second surface of the release liner, where the antistatic composition comprises an organic cationic polyelectrolyte, a binder, and a surfactant. The antistatic composition reduces the surface resistivity of the second surface of the release liner so as to eliminate static build-up during use of the labels. The second surface of the release liner (including the antistatic composition) preferably has a surface resistivity of less than about $10^{11}$ ohm/square and more preferably, about $10^8$ ohm/square.

Preferably, the label construction further includes a toner adhesion-enhancing coating on the first surface of the substrate which provides enhanced adhesion of toner images printed on the substrate.

In an alternative embodiment of the invention, a continuous series of labels is provided comprising a web having first and second major surfaces and having a series of individual labels thereon. A pressure sensitive adhesive is included on the second surface of the web, with a release liner having first and second major surfaces overlying the pressure sensitive adhesive. An antistatic composition is included on the second surface of the release liner comprising an organic cationic polyelectrolyte, a binder, and a surfactant. In this embodiment, the web preferably comprises polyester and is in the form of a roll.

In another alternative embodiment of the invention, a stack of individual labels is provided, where each individual label comprises a substrate having first and second major surfaces, a pressure sensitive adhesive is on the second surface of the substrate; and a release liner having first and second major surfaces overlies the pressure sensitive adhesive. An antistatic composition is included on the second surface of the release liner such that the antistatic composition on the release liner of one label in the stack contacts the surface of an adjacent label in the stack. In this embodiment, the antistatic composition also reduces the coefficient of friction between adjacent labels in the stack.

Accordingly, it is a feature of the present invention to provide an antistatic composition for use in a label construction which reduces the build-up of static electricity. It is also a feature of the present invention to provide an antistatic composition which reduces the build-up of static electricity in a stack or roll of labels. It is a further feature of the present invention to provide an antistatic composition which may be used in combination with a toner-adhesion enhancing coating to provide high print quality on a label construction. Other features and advantages of the invention will be apparent from the following description, the accompanying drawings, and the appended claims.

DETAILED DESCRIPTION OF THE PREFERRED EMBODIMENT

The antistatic composition of the present invention is useful in a variety of label constructions using polymer films, particularly where the labels are stacked or provided in roll form such that the labels are in adjacent contact. By providing an antistatic composition on the second (outer) surface of the release liner, the properties of the polymer film remain unaffected while static charge build-up between the film and release liner in adjacent labels are reduced. In addition, because the antistatic composition is applied to the release liner rather than the polymer film layer, any toner adhesion-enhancing coating which is applied to the film does not negate the effectiveness of the antistatic composition as has occurred with prior art label constructions.

The antistatic composition of the present invention comprises, as the antistatic component, an organic cationic polyelectrolyte, which functions to reduce the surface electrical resistance of the polymer film label, thereby reducing static build-up. A preferred organic cationic polyelectrolyte is available from Ciba Specialty Chemicals under the designation Alcostat 167. The organic cationic polyelectrolyte preferably comprises from about 40 to 90% by weight of the antistatic composition.

The antistatic composition also preferably includes a binder. A preferred binder for use in the present invention is polyvinylpyrrolidone, available from BASF Corporation under the designation PVP K-30. The binder may comprise from about 5 to 40% by weight of the antistatic composition.

The antistatic composition also preferably includes from about 0.01 to about 2% by weight of a surfactant to enhance the surface wetting of the composition. A suitable surfactant is Silwet L-77, available from Osi Specialties.

The antistatic composition may optionally include a small amount of a biocide (about 0.02 to 0.5% by weight) to prevent fungus and bacteria growth. A preferred biocide is Amical Flowable, available from Angus Chemical Co.

The composition may optionally include a number of fillers or additives. For example, urea may be added as a water-soluble diluent to increase the solids content for faster drying. A fluorescent dye may be added to aid in evaluating print quality. The composition may also include a filler such as rice starch which acts to eliminate tackiness of the coating.

The balance of the composition preferably comprises water. The antistatic composition may be applied using any suitable technique for the application of aqueous coating compositions. Preferably, the composition is applied by flexographic roll coating or rotogravure coating methods.

Figure 1:
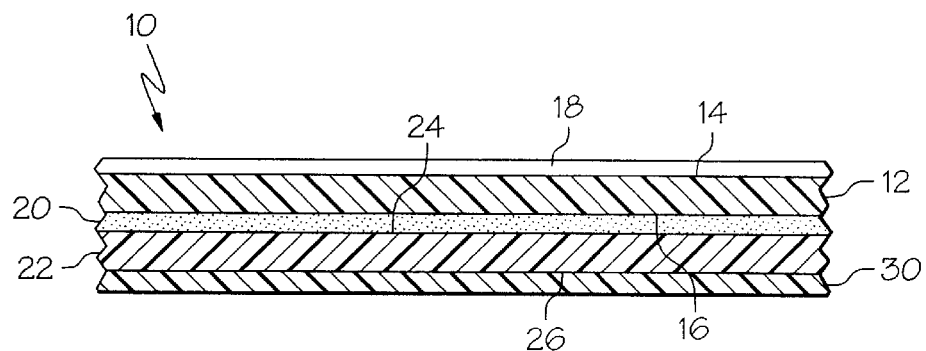
FIG. 1 is a cross-sectional view of a label including the antistatic composition of the present invention.

Referring now to FIG. 1, a label construction 10 is shown which utilizes the antistatic composition of the present invention. The label construction includes a substrate 12 having first and second surfaces 14 and 16, respectively. The substrate 12 preferably comprises a printable polymer film such as polyester which may be printed with toner images from a noncontact printer (not shown). Preferably, the substrate is coated with a toner adhesion-enhancing coating 18 on its first surface 14 which functions to enhance the adhesion of toner images printed on the film. A suitable toner adhesion-enhancing coating for use in the present invention is disclosed in commonly-assigned U.S. Pat. No. 5,045,426 to Maierson et al., the disclosure of which is hereby incorporated by reference. Other suitable toner adhesion-enhancing coatings are disclosed in U.S. Pat. Nos. 4,942,410 and 5,102,737.

The label also includes a pressure sensitive adhesive 20 on the second surface 16 of the substrate, a release liner 22 having first and second surfaces 24 and 26, and an antistatic composition 30 on the second surface 26 of the release liner. The release liner preferably comprises a cellulosic substrate which includes a release coating on the surface which is in contact with pressure sensitive adhesive 20. An example of a commercially available release liner suitable for use in the present invention is a 78# C1S clay coated solventless base paper including a solventless release coating, available from Boise Cascade. A basic label construction including a polymer film layer, adhesive layer, and release liner is also commercially available. One suitable construction is available from NAStar Inc. of Middleton, Wis. and includes a NAStar laser clear polyester layer, R6330 adhesive and 78# white kraft release liner.

Figure 2:
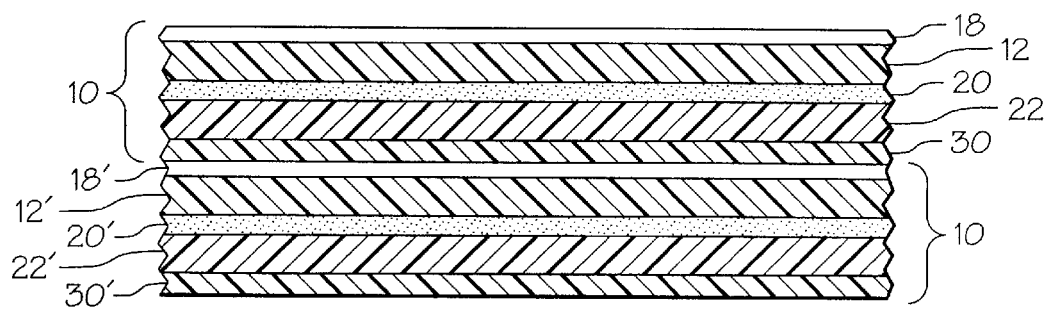
FIG. 2 is a cross-sectional view of adjacent labels in the form of a stack or roll.
Figure 3:
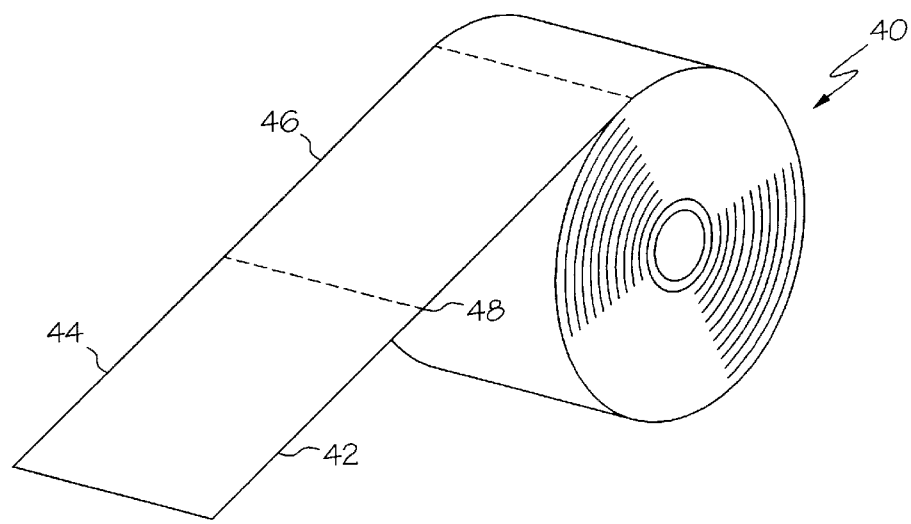
FIG. 3 is a perspective view of a roll of labels in accordance with the present invention.
Figure 4:
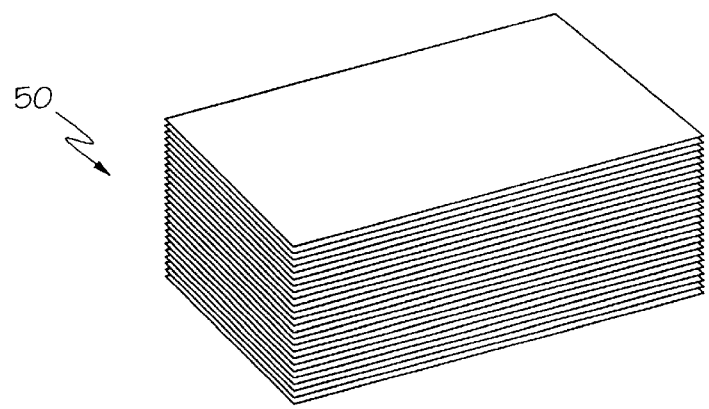
FIG. 4 is a perspective view of a stack of labels in accordance with the present invention.

FIG. 2 is a cross-sectional view illustrating individual labels in adjacent contact which may be provided in the form of a roll 40 as shown in FIG. 3 or in a stack 50 as shown in FIG. 4. The respective adjacent labels include a substrate 12, 12' including a toner adhesion enhancing coating 18, 18'. The labels also include a pressure sensitive adhesive 20, 20' on the second surface of the substrate, a release liner 22, 22', and an antistatic composition 30, 30' on the second surface of the release liner. As shown, the antistatic composition 30 on the release liner of one label is in contact with the toner adhesion-enhancing coated film layer 12' of the adjacent label in the stack so as to prevent static charge build-up on the surface of label substrate 12'.

Referring now to FIG. 3, the label construction is shown in the form of a roll 40 comprising a continuous web 42 having individual labels 44, 46, etc. The individual labels may be unwound and severed from roll 40 along perforations 48. The labels may also be individually die cut. As described above, the antistatic composition on the release liner of one label on the roll contacts the film surface of an adjacent label in the roll to prevent static charge build-up.

In the embodiment shown in FIG. 4, individual labels are positioned on top of one another to form a stack 50 from which the labels may be peeled away and dispensed one by one or may be fed to a printer. Because the antistatic composition on the release liner of one label in the stack contacts the film surface of an adjacent label in the stack, the coefficient of friction is reduced between adjacent labels in the stack, resulting in fewer jams and misfeeds during printing of the labels.

We have found that the antistatic composition of the present invention reduces the surface resistivity of the second surface of the release liner in a label construction from about $10^{11}$ to about $10^8$ ohm/square as tested by ASTM method D 4949-89. In addition, the antistatic composition reduced the coefficient of friction between adjacent labels as compared with uncoated labels in accordance with ASTM method 4917.

In order that the invention may be more readily understood, reference is made to the following examples which are intended to illustrate the invention, but not limit the scope thereof.

EXAMPLE 1

The following formulas illustrate antistatic compositions prepared in accordance with the present invention:

| Formula 1 | Weight % |
| --- | --- |
| Polyvinylpyrrolidone binder[1] | 20.01 |
| Tap water | 4.15 |
| Surfactant[2] | 0.5 |
| Biocide[3] | 0.2 |
| Fluorescent dye[4] | 0.1 |
| Antistatic additive[5] | 75.04 |

[1]PVP K-30 from BASF Corporation, Parsippany, NJ
[2]Silwet L-77 from Osi Specialties, Danbury, CT
[3]Amical Flowable from Angus Chemical Co., Buffalo Grove, IL
[4]Tinopal SCP from Ciba Specialty Chemicals, High Point, NC
[5]Alcostat 167 from Ciba Specialty Chemicals, High Point, NC

| Formula 2 | Weight % |
| --- | --- |
| Polyvinylpyrrolidone binder[1] | 7.9 |
| Tap water | 22.96 |
| Surfactant[2] | 0.38 |
| Biocide[3] | 0.2 |
| Solvent Red Dispersion dye[4] | 1.59 |
| Antistatic additive[5] | 57.13 |
| Rice Starch | 9.84 |

[1]PVP K-30 from BASF Corporation, Parsippany, NJ
[2]Silwet L-77 from Osi Specialties, Danbury, CT
[3]Amical Flowable from Angus Chemical Co., Buffalo Grove, IL
[4]Aakash Chemicals & Dye Stuffs, Glendale Heights, IL
[5]Alcostat 167 from Ciba Specialty Chemicals, High Point, NC

| Formula 3 | Weight % |
| --- | --- |
| Antistatic additive[1] | 67.4 |
| Tap water | 32.09 |
| Fluorescent dye[2] | 0.5 |
| Surfactant[3] | 0.01 |

[1]Alcostat 167 from Ciba Specialty Chemicals, High Point, NC
[2]Tinopal SCP from Ciba Specialty Chemicals, High Point, NC
[3]Silwet L-77 from Osi Specialties, Danbury, CT

| Formula 4 | Weight % |
| --- | --- |
| Polyvinylpyrrolidone binder[1] | 15.35 |
| Tap water | 3.41 |
| Surfactant[2] | 0.38 |
| Biocide[3] | 0.23 |
| Fluorescent dye[4] | 0.07 |
| Antistatic additive[5] | 57.54 |
| Urea | 15.35 |
| Rice Starch | 7.67 |

[1]PVP K-30 from BASF Corporation, Parsippany, NJ
[2]Silwet L-77 from Osi Specialties, Danbury, CT
[3]Amical Flowable from Angus Chemical Co., Buffalo Grove, IL
[4]Tinopal SCP from Ciba Specialty Chemicals, High Point, NC
[5]Alcostat 167 from Ciba Specialty Chemicals, High Point, NC While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An antistatic composition for reducing the surface resistivity on the surface of a release liner in a label construction, said composition comprising an organic cationic polyelectrolyte, a binder, and a surfactant.

2. The antistatic composition of claim 1 wherein said binder comprises polvinylpyrrolidone.

3. A label construction comprising:
   a) a substrate having first and second major surfaces;
   b) a pressure sensitive adhesive on said second surface of said substrate;
   c) a release liner overlying said pressure sensitive adhesive; said release liner having first and second major surfaces and comprising a cellulosic substrate, said first surface of said release liner contacting said pressure sensitive adhesive; and
   d) an antistatic composition on said second surface of said release liner.

4. The label construction of claim 3 wherein said antistatic composition comprises an organic cationic polyelectrolyte, a binder, and a surfactant.

5. The label construction of claim 3 further including a toner adhesion-enhancing coating on said first surface of said substrate.

6. The label construction of claim 3 wherein said substrate comprises polyester.

7. The label construction of claim 4 wherein said antistatic composition reduces the surface resistivity of said second surface of said release liner.

8. The label construction of claim 4 wherein said second surface of said release liner has a surface resistivity of about $10^8$ ohms.

9. The label construction of claim 3 wherein said release liner includes a release coating on it first surface.

10. A continuous series of labels comprising:
    a web having a series of individual labels thereon, said web comprising first and second major surfaces;
    a pressure sensitive adhesive on said second surface of said web;
    a release liner overlying said pressure sensitive adhesive, said release liner having first and second major surfaces and comprising a cellulosic substrate, said first surface of said release liner contacting said pressure sensitive adhesive; and
    an antistatic composition on said second surface of said release liner.

11. The continuous series of labels of claim 10 wherein said antistatic composition comprises an organic cationic polyelectrolyte, a binder, and a surfactant.

12. The continuous series of labels of claim 10 wherein said web comprises polyester.

13. The continuous series of labels of claim 10 wherein said web is in the form of a roll.

14. A stack of individual labels, wherein each individual label comprises:
    a) a substrate having first and second major surfaces;
    b) a pressure sensitive adhesive on said second surface of said substrate;
    c) a release liner overlying said pressure sensitive adhesive; said release liner having first and second major surfaces and comprising a cellulosic substrate, said first surface of said release liner contacting said pressure sensitive adhesive; and
    d) an antistatic composition on said second surface of said release liner; wherein said antistatic composition on said release liner of one label in said stack contacts the surface of an adjacent label in said stack.

15. The stack of labels of claim 14 wherein said antistatic composition reduces the coefficient of friction between adjacent labels in said stack.

16. A label construction comprising:
   a) a substrate having first and second major surfaces;
   b) a pressure sensitive adhesive on said second surface of said substrate;
   c) a release liner overlying said pressure sensitive adhesive; said release liner having first and second major surfaces, said first surface of said release liner contacting said pressure sensitive adhesive; and
   d) an antistatic composition on said second surface of said release liner, said antistatic composition comprising an organic cationic polyelectrolyte, a binder, and a surfactant.

* * * * *